United States Patent
Mukker et al.

(10) Patent No.: US 8,041,849 B2
(45) Date of Patent: Oct. 18, 2011

(54) METHOD FOR HANDLING SMALL COMPUTER SYSTEM INTERFACE (SCSI) COMMANDS VIA A REDUNDANT ARRAY OF INEXPENSIVE DISKS (RAID) DEVICE DRIVER

(75) Inventors: Atul Mukker, Suwanee, GA (US); Sreenivas Bagalkote, Suwanee, GA (US); Jose K. Manoj, Lilburn, GA (US)

(73) Assignee: LSI Corporation, Milpitas, CA (US)

( * ) Notice: Subject to any disclaimer, the term of this patent is extended or adjusted under 35 U.S.C. 154(b) by 776 days.

(21) Appl. No.: 12/217,152

(22) Filed: Jul. 2, 2008

(65) Prior Publication Data

US 2010/0005482 A1 Jan. 7, 2010

(51) Int. Cl.
*G06F 13/28* (2006.01)
*G06F 3/00* (2006.01)
*G06F 13/00* (2006.01)

(52) U.S. Cl. ............ 710/22; 719/321; 719/326; 710/26; 711/100

(58) Field of Classification Search .................. None
See application file for complete search history.

(56) References Cited

U.S. PATENT DOCUMENTS

2008/0091915 A1* 4/2008 Moertl et al. ................. 711/206
* cited by examiner

*Primary Examiner* — Alan Chen
(74) *Attorney, Agent, or Firm* — Suiter Swantz pc llo

(57) ABSTRACT

The present invention is a method for handling an operation system kernel-provided command via a software-based device driver. The method includes receiving the operation system kernel-provided command from an operation system kernel. The method further includes determining if a kernel virtual address is required for responding to the command. The method further includes initiating a Direct Memory Access (DMA) operation for providing data to the operating system kernel in response to the command when a kernel virtual address is not required for responding to the command. The method further includes allocating a device driver buffer with a DMA address and a virtual address when a kernel virtual address is required for responding to the command.

20 Claims, 2 Drawing Sheets

METHOD FOR HANDLING SMALL COMPUTER SYSTEM INTERFACE (SCSI) COMMANDS VIA A REDUNDANT ARRAY OF INEXPENSIVE DISKS (RAID) DEVICE DRIVER

FIELD OF THE INVENTION

The present invention relates to the field of electronic data storage and particularly to a method for handling Small Computer System Interface (SCSI) commands via a Redundant Array of Inexpensive Disks (RAID) device driver.

BACKGROUND OF THE INVENTION

Currently available methods by which software-based device drivers handle operating system kernel-provided commands may not be conducive to allowing said software-based device driver to have a desired level of portability across various operating system environments.

Therefore, it may be desirable to provide a method for operating system kernel-provided commands which addresses the above-referenced shortcomings of currently available methods.

SUMMARY OF THE INVENTION

Accordingly, an embodiment of the present invention is directed to a method for handling an operating system kernel-provided command via a software-based device driver, said method including: receiving the operating system kernel-provided command from an operating system kernel; determining if a kernel virtual address is required for responding to the command; when a kernel virtual address is not required for responding to the command, initiating a Direct Memory Access (DMA) operation for providing data to the operating system kernel in response to the command; and when a kernel virtual address is required for responding to the command, allocating a device driver buffer with a DMA address and a virtual address.

A further embodiment of the present invention is directed to a computer-readable medium having computer-executable instructions for performing a method for handling an operating system kernel-provided command, said method including: receiving the operating system kernel-provided command from an operating system kernel; determining if a kernel virtual address is required for responding to the command; when a kernel virtual address is not required for responding to the command, initiating a Direct Memory Access (DMA) operation for providing data to the operating system kernel in response to the command; and when a kernel virtual address is required for responding to the command, allocating a device driver buffer with a DMA address and a virtual address.

An additional embodiment of the present invention is directed to a method for handling an operating system kernel-provided command via a software-based device driver, said method including: receiving the operating system kernel-provided command from an operating system kernel; determining if a kernel virtual address is required for responding to the command; when a kernel virtual address is not required for responding to the command, initiating a Direct Memory Access (DMA) operation for providing data to the operating system kernel in response to the command; when a kernel virtual address is required for responding to the command, allocating a device driver buffer with a DMA address and a virtual address; and based upon the operating system kernel-provided command, populating the device driver buffer with data.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
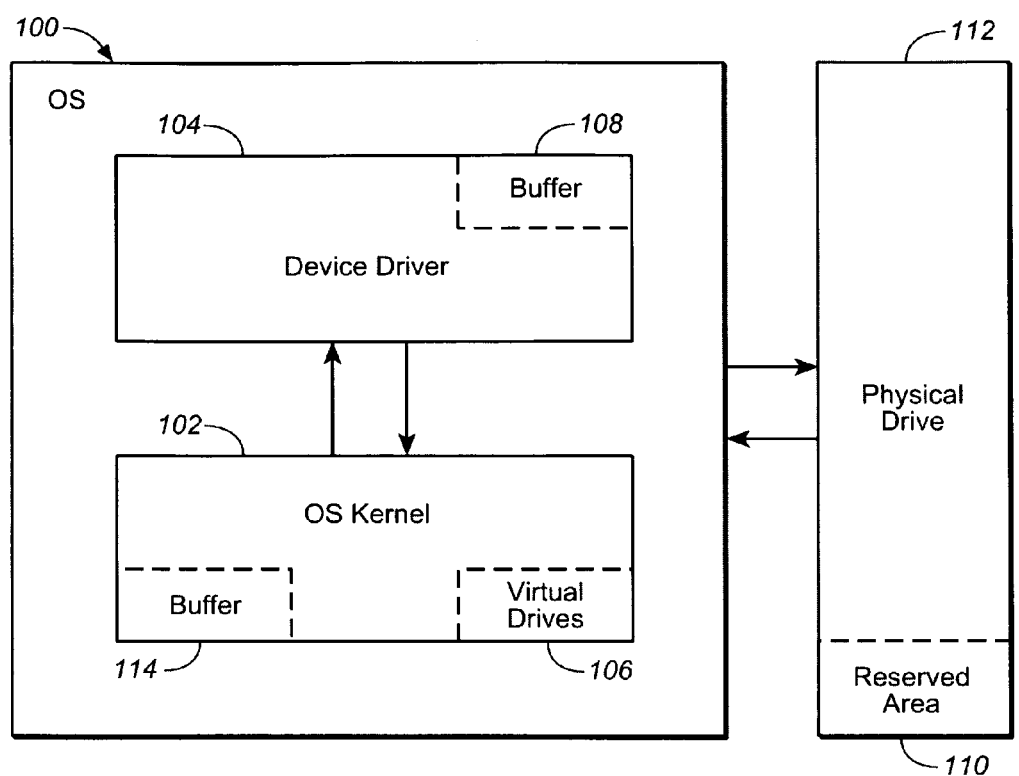
FIG. 1 is a block diagram schematic illustrating an operating system in/with which a RAID device driver is being implemented in accordance with an exemplary embodiment of the present invention.

Reference will now be made in detail to the presently preferred embodiments of the invention, examples of which are illustrated in the accompanying drawings.

A software-based Redundant Array of Inexpensive Disks (RAID) device driver stack may implement virtual disk drives. The virtual disk drives may be exported to an operating system kernel as devices which follow Small Computer System Interface (SCSI) protocol. Because the virtual disk drives exported by the RAID device driver stack are SCSI (ex.—follow SCSI protocol), said exported virtual disk drives may be required to honor all SCSI commands issued by the operating system kernel.

Modern operating systems may employ a data transfer technique called Direct Memory Access (DMA) for transferring information/data from devices and system memory. Since the above-referenced disk drives/disk devices exported by the RAID device driver stack/RAID stack are virtual disk drives, only a subset of SCSI commands may actually be able to be fulfilled by the RAID device driver stack by using DMA operations. For example, the subset of SCSI commands which may be able to be fulfilled using DMA operations may include: SCSI_READ; SCSI_WRITE; SCSI_SYNCHRONIZE_CACHE, etc. Alternatively, a large subset of SCSI commands may not be able to be fulfilled/completed by the RAID device driver stack by using DMA operation(s). For instance, the subset of SCSI commands which may not be able to be fulfilled/completed using DMA operations may include: SCSI_INQUIRY, SCSI_READ_CAPACITY, etc.

For the SCSI commands which cannot be completed using DMA, the RAID device driver stack may have to generate appropriate data for the operating system kernel. Due to the nature of modern operating system device drivers, RAID device driver stacks/device drives may be unable to trivially access the addresses used by the operating system(s) for DMA. The ability to access such addresses may be limited to hardware chips which can perform DMA operations. Said limitation may put the software-based RAID device drivers at risk because said software-based RAID device drivers may be unable to achieve the basic functionality of transferring data to the operating system kernels.

A number of solutions have been implemented by various modern operating system kernel developers for addressing the above-referenced limitations/problems. For example, a number of operating system kernels may provide Application Programming Interfaces (APIs) which may be used by device drivers/software-based RAID device driver stacks for generating kernel virtual addresses for given DMA addresses. Device drivers such as software-based RAID device driver stacks may invoke APIs selectively, based on the SCSI command type, and may obtain/generate a driver-accessible kernel virtual address. Once an appropriate address is generated, a device driver may use it to transfer data to/from the operating system kernel.

A disadvantage associated with the above-referenced existing solution(s) may be a lack of general availability. For instance, not all operating system vendors have employed/implemented the above-referenced solutions/techniques in their operating systems' respective device drivers. Further, for a given operating system vendor, its operating system may have multiple versions of kernels, not all of which may have implemented said solution(s). Operating systems which do not implement said solution(s)/features may attach quite a number of strings on how/when said features may be used. Additionally, limitations faced while implementing a software-based RAID device driver stack may include: the API to get a kernel virtual address for a given DMA address may not be invoked by the device driver in many contexts, such as when a SCSI command is submitted to the device driver by the operating system kernel for immediate execution, or in an interrupt context; the use of APIs may consume important kernel resources and therefore, may be prone to a higher failure rate, which may require implementation of an elaborate recovery mechanism in the software-based RAID device driver stack; and in some cases an operating system kernel may put a limitation on how many such translations may be outstanding (ex.—this may sometimes be as low as one), which may be a significant design limitation for an aspiring high-performance stack (such as a software-based RAID device driver stack). Since APIs may be specific to operating system kernels, portability of the RAID device driver stack between operating systems may be affected.

The system/method of the present invention allows for removal of the above-referenced limitations of existing solutions. For example, the present invention, because it is operating system-independent and/or operating system kernel-independent, does not suffer from a low resource condition and may allow for device driver portability across various operating system environments.

Figure 2:
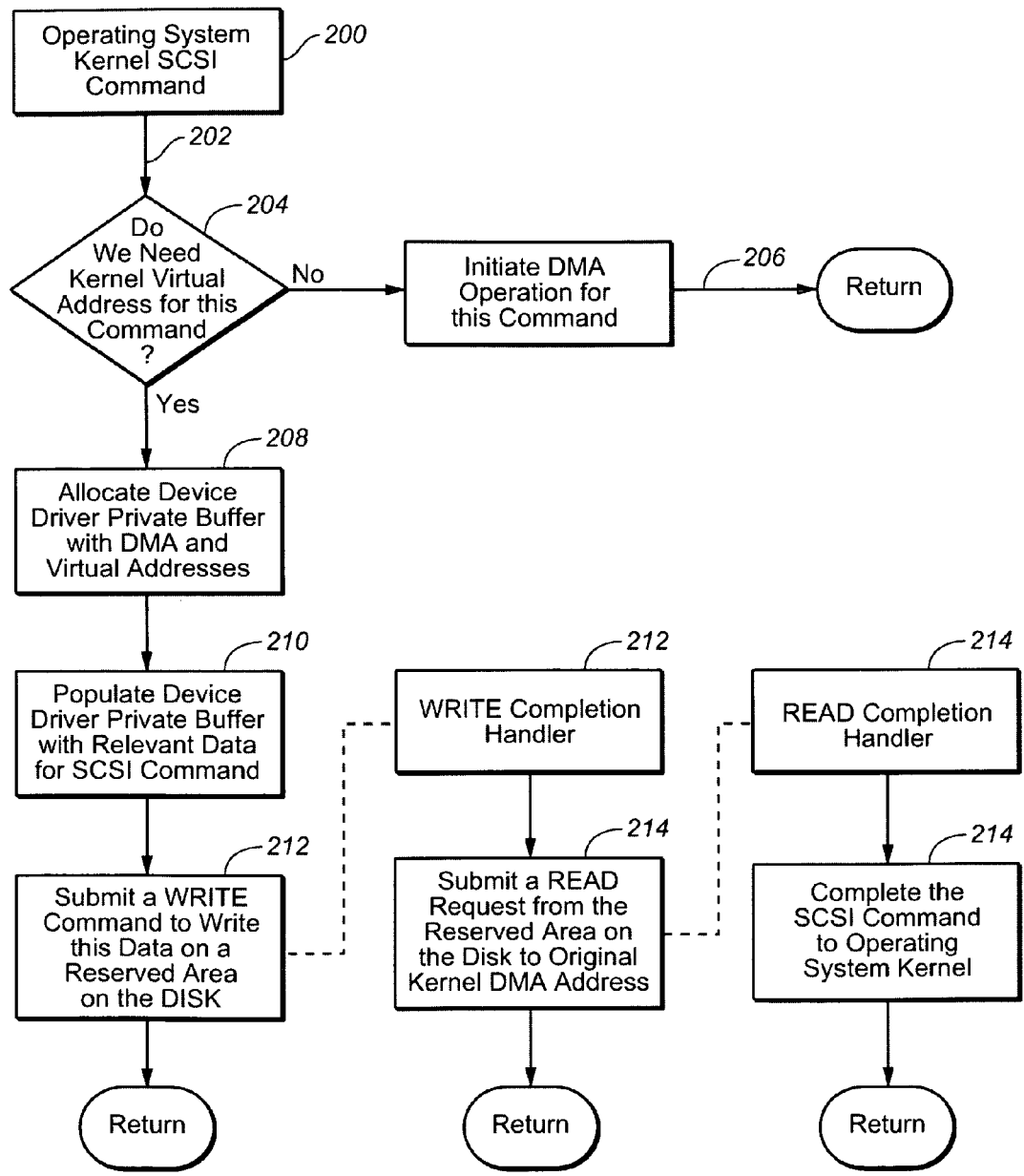
FIG. 2 is a flow chart illustrating a method for handling Small Computer System Interface (SCSI) commands via a Redundant Array of Inexpensive Disks (RAID) device driver without utilizing kernel virtual addresses in accordance with an exemplary embodiment of the present invention.

Referring generally to FIGS. 1 and 2, FIG. 2 is a flowchart illustrating a method for handling an operating system kernel-provided command via a software-based device driver in accordance with an exemplary embodiment of the invention. FIG. 1 is a block diagram schematic illustrating an operating system within/with which a software-based device driver may be implemented in accordance with an exemplary embodiment of the present invention. In exemplary embodiments, the method 200 may include receiving a command from an operating system kernel 202. For example, the operating system kernel 102 of an operating system 100 may be communicatively coupled with a software-based device driver 104 (ex.—a Redundant Array of Inexpensive Disks (RAID) software-based device driver). Further, the operating system may provide the command (ex.—a Small Computer System Interface (SCSI) command) which may be received by the software-based device driver 104. In current embodiments of the present invention, virtual disk drive(s) 106 implemented by the software-based device driver 104 may be exported to the operating system kernel 102.

In further embodiments, the method 200 may further include determining if a kernel virtual address is required for responding to/fulfilling the operating system kernel-provided command 204. For instance, after receiving the operating system kernel-provided command, the software-based device driver 104 may determine if kernel virtual addresses are required for fulfilling the command. In additional embodiments, when it is determined that a kernel virtual address is not required for responding to/fulfilling the command, the method 200 may further include initiating a Direct Memory Access (DMA) operation for providing data (ex.—relevant data for fulfilling the operating system kernel-provided command) to the operating system kernel 102 in response to the operating system kernel-provided command 206.

In current embodiments of the present invention, when it is determined that a kernel virtual address is required for responding to/fulfilling the command, the method 200 may further include allocating a device driver buffer 108 (ex.—a private buffer) with a DMA address(es) and a virtual address (es) 208. In further embodiments, the method 200 may further include populating the device driver buffer 108 with data (ex.—relevant data for fulfilling the operating system kernel-provided command) 210.

In exemplary embodiments, the method 200 may further include initiating (ex.—submitting via a Write Completion Handler) a write command for writing the data (ex.—the relevant data for fulfilling the operating system kernel-provided command) from the device driver buffer to a reserved area of a physical disk drive 212. For example, the physical disk drive 112 which includes the reserved area 110 may be a RAID physical disk drive of a RAID configuration, and said RAID physical disk drive 112 may be communicatively coupled with one or more of the operating system 100, the operating system kernel 102, and the device driver 104.

In further embodiments, the method 200 may further include initiating a read command for reading the data from the reserved area of the physical disk drive to a buffer of the operating system kernel 214 (ex.—which may result in completing the SCSI command wherein the data relevant to fulfilling the operating system kernel-provided command is provided to the operating system kernel via the read command). For example, the read command/request may be submitted via a Read Completion Handler, such that the data (ex.—the relevant data for fulfilling the operating system kernel-provided command) may be read from the reserved area 110 of the physical disk drive 112 to the operating system kernel 102 (ex.—a buffer 114 of the operating system kernel 102/an original DMA address of the operating system kernel 102). For instance, the read command may a DMA-based read command. The above-described method 200 of the present invention may allow for handling/fulfillment of operating system kernel-provided commands via a software-based device driver without requiring the software-based device driver to generate kernel virtual addresses via APIs. One or more of the above-referenced steps of the method 200 of the present invention may be performed by the software-based device driver 104.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for handling an operating system kernel-provided command via a software-based device driver, comprising:
    receiving the operating system kernel-provided command from an operating system kernel;
    determining if a kernel virtual address is required for responding to the command;
    when a kernel virtual address is not required for responding to the command, initiating a Direct Memory Access (DMA) operation for providing data to the operating system kernel in response to the command; and
    when a kernel virtual address is required for responding to the command, allocating a device driver buffer with a DMA address and a virtual address.

2. A method as claimed in claim 1, further comprising:
    based upon the operating system kernel-provided command, populating the device driver buffer with data.

3. A method as claimed in claim 2, further comprising:
    initiating a write command for writing the data to a reserved area of a physical disk drive.

4. A method as claimed in claim 3, further comprising:
    initiating a read command for reading the data from the reserved area of the physical disk drive to a buffer of the operating system kernel.

5. A method as claimed in claim 1, wherein the operating system kernel-provided command is a Small Computer System Interface (SCSI) command.

6. A method as claimed in claim 1, wherein the software-based device driver is a Redundant Array of Inexpensive Disks (RAID) device driver.

7. A method as claimed in claim 4, wherein the read command is a DMA-based read command.

8. A computer-readable medium having computer-executable instructions for performing a method for handling an operating system kernel-provided command, said method comprising:
    receiving the operating system kernel-provided command from an operating system kernel;
    determining if a kernel virtual address is required for responding to the command;
    when a kernel virtual address is not required for responding to the command, initiating a Direct Memory Access (DMA) operation for providing data to the operating system kernel in response to the command; and
    when a kernel virtual address is required for responding to the command, allocating a device driver buffer with a DMA address and a virtual address.

9. A computer-readable medium as claimed in claim 8, said method further comprising:
    based upon the operating system kernel-provided command, populating the device driver buffer with data.

10. A computer-readable medium as claimed in claim 9, said method further comprising:
    initiating a write command for writing the data to a reserved area of a physical disk drive.

11. A computer-readable medium as claimed in claim 10, said method further comprising:
    initiating a read command for reading the data from the reserved area of the physical disk drive to a buffer of the operating system kernel.

12. A computer-readable medium as claimed in claim 8, wherein the operating system kernel-provided command is a Small Computer System Interface (SCSI) command.

13. A computer-readable medium as claimed in claim 8, said computer-readable medium comprising a software-based device driver.

14. A computer-readable medium as claimed in claim 11, wherein the read command is a DMA-based read command.

15. A method for handling an operating system kernel-provided command via a software-based device driver, comprising:
    receiving the operating system kernel-provided command from an operating system kernel;
    determining if a kernel virtual address is required for responding to the command;
    when a kernel virtual address is not required for responding to the command, initiating a Direct Memory Access (DMA) operation for providing data to the operating system kernel in response to the command;
    when a kernel virtual address is required for responding to the command, allocating a device driver buffer with a DMA address and a virtual address; and
    based upon the operating system kernel-provided command, populating the device driver buffer with data.

16. A method as claimed in claim 15, further comprising:
    initiating a write command for writing the data to a reserved area of a physical disk drive.

17. A method as claimed in claim 16, further comprising:
    initiating a read command for reading the data from the reserved area of the physical disk drive to a buffer of the operating system kernel.

18. A method as claimed in claim 15, wherein the operating system kernel-provided command is a Small Computer System Interface (SCSI) command.

19. A method as claimed in claim 15, wherein the software-based device driver is a Redundant Array of Inexpensive Disks (RAID) device driver.

20. A method as claimed in claim 17, wherein the read command is a DMA-based read command.

* * * * *